April 13, 1954   A. LEWIS ET AL   2,674,935
FLASH STEAMER FOR REFRESHENING FOOD PRODUCTS
Filed Jan. 25, 1950   7 Sheets-Sheet 2
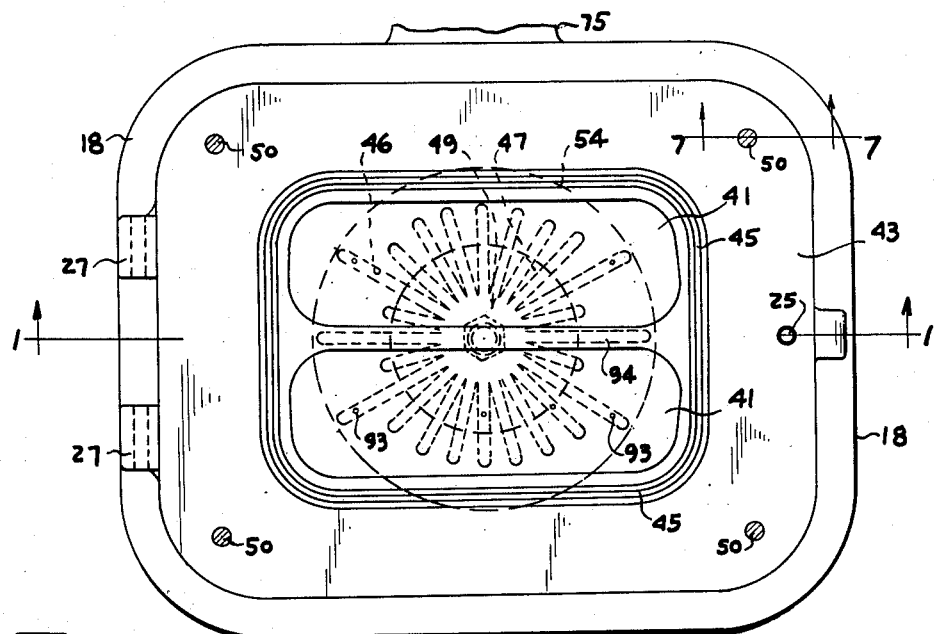
Fig. 2
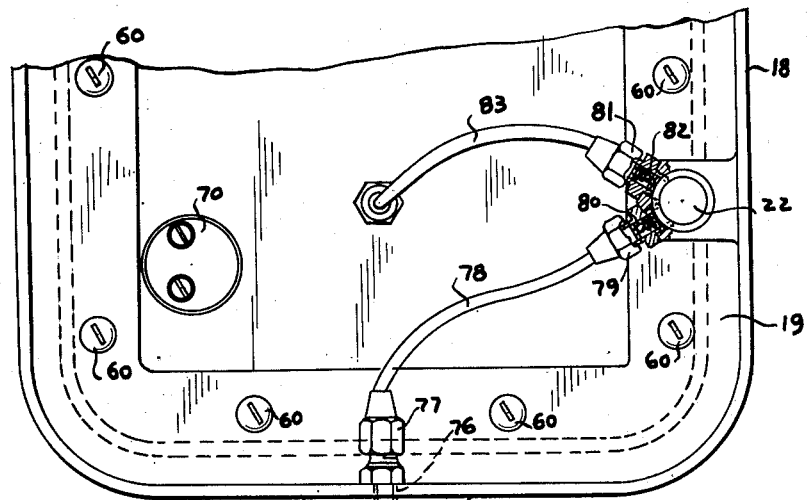
Fig. 3
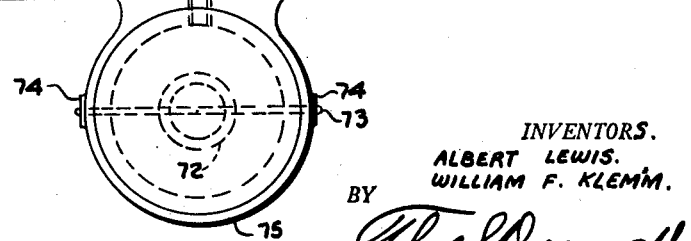
INVENTORS.
ALBERT LEWIS.
WILLIAM F. KLEMM.
BY
ATTORNEY.

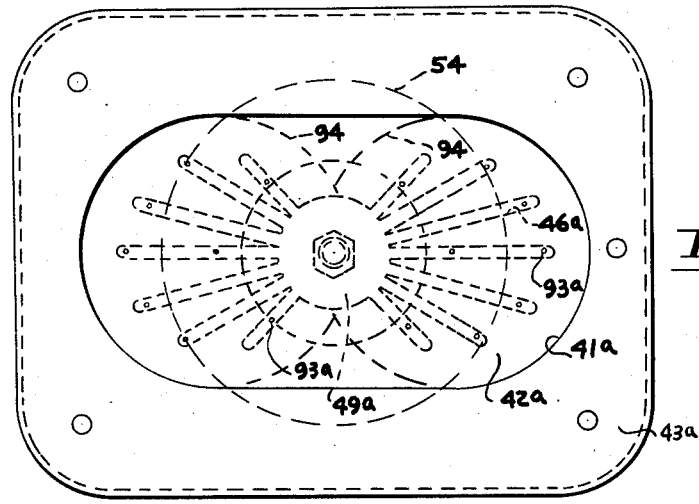
Fig_8
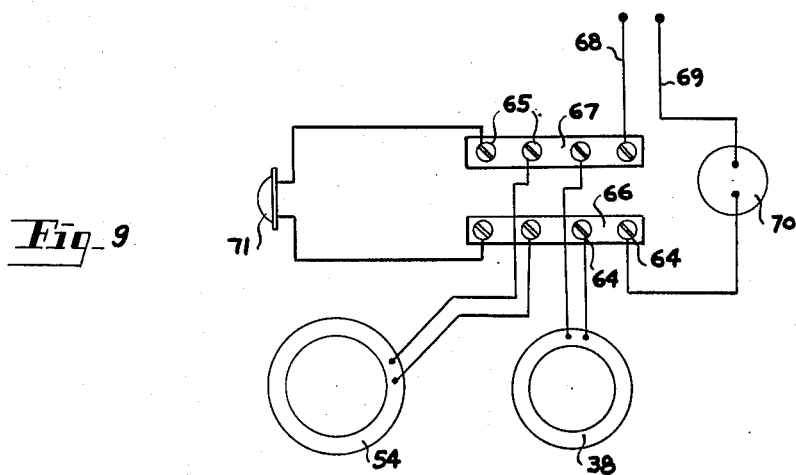
Fig_9
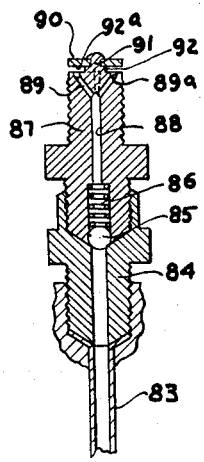
Fig_10
INVENTORS.
ALBERT LEWIS.
WILLIAM F. KLEMM.
BY
ATTORNEY

INVENTORS.
ALBERT LEWIS.
WILLIAM F. KLEMM
BY
ATTORNEY.

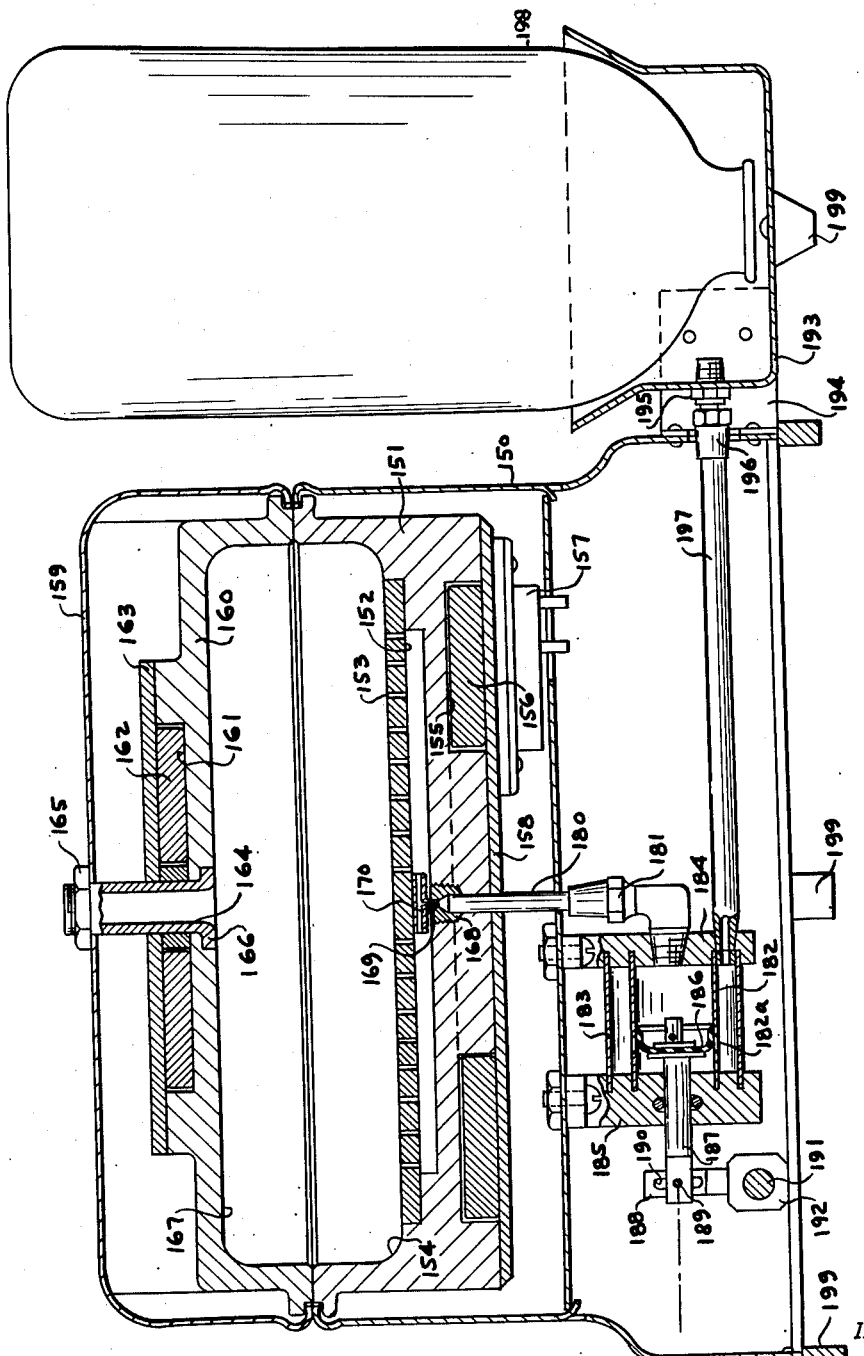

April 13, 1954 A. LEWIS ET AL 2,674,935
FLASH STEAMER FOR REFRESHENING FOOD PRODUCTS
Filed Jan. 25, 1950 7 Sheets-Sheet 7
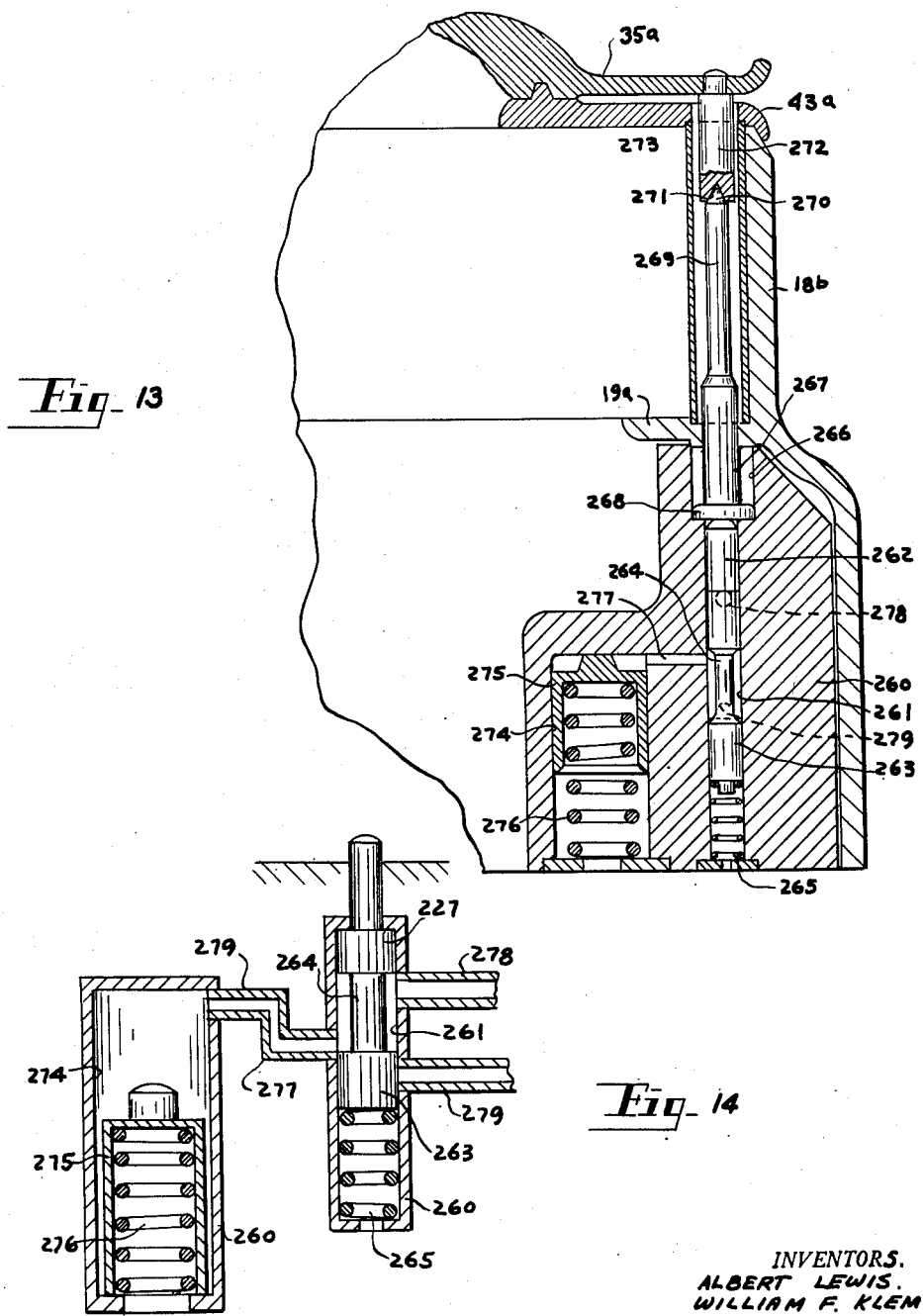
INVENTORS.
ALBERT LEWIS.
WILLIAM F. KLEMM.
BY
Thos. S. Donnelly
ATTORNEY Patented Apr. 13, 1954

2,674,935

UNITED STATES PATENT OFFICE 2,674,935

FLASH STEAMER FOR REFRESHENING FOOD PRODUCTS

Albert Lewis and William F. Klemm,
Detroit, Mich.

Application January 25, 1950, Serial No. 140,526

8 Claims. (Cl. 99—234)

1

Our invention relates to a new and useful improvement in flash steamers for re-freshening food products and particularly adapted for use in refreshening buns which are used in making sandwiches and for other purposes. In making various kinds of sandwiches and particularly sandwiches embodying a hot frankfurter or a hot hamburger it is customary to steam the buns so that it also will be hot, in a fresh condition, and highly palatable. It is also desirable that the steaming do not render the buns soggy or excessively moist. This is one of the difficulties encountered where the buns are placed in a steamer for a period of time, and removed from the steamer periodically when desired. The present invention is intended to provide a structure whereby the refreshening of the buns can be easily and quickly effected so as to avoid the objectionable features of the constant steaming and to provide a product superior in many respects so far as its condition and particularly its freshness is concerned. While the invention is particularly adapted for refreshening buns used for sandwiches it will appear obvious from the description that it may also be used for refreshening other types of food such as sweet rolls, ordinary bread rolls and similar food products.

In addition to using the invention for refreshening foods, the device may also be used as a sterilizer. When used for such purposes, the instrument to be sterilized would be placed in the compartment provided and in the operation of the device an instantaneous sterilization of the instruments may be effected. This is particularly useful in surgery where an emergency is encountered. It is also particularly useful in field operations where a standard sterilizer containing boiling water is not available. Of course, by having a structure operated in the manner of the present invention, that is by flash production of super heated steam, sterilization is quickly effected thus avoiding delay which is encountered when it is necessary to raise a large quantity of water to the boiling point.

It is another object of the invention to provide a mechanism whereby steam may be delivered to the food products to be refreshened in a flash operation and in such a manner that the steam will, while in a dry state, be forced to penetrate the food product.

Another object of the invention is the provision of a mechanism whereby a predetermined amount of water will be delivered to the steam generating section and this steam instantaneously generated and delivered to the product to be operated upon.

2

Another object of the invention is the provision in a structure of this type of mechanism whereby a delivery of the specified amount of water may be automatically effected and determined.

Another object of the invention is the provision of a mechanism whereby the predetermined amount of water delivered to the heat generating system may be instantly turned into steam and rendered into a dry state.

Another object of the invention is the provision of a food refreshening device of this class which will be simple in structure, economical in manufacture, durable, compact, easy of operation and highly efficient in use.

Other objects will appear hereinafter.

It is recognized that various modifications and changes may be made in the detail of the structure illustrated without departing from the invention and it is to be understood that the disclosure herein is but the preferred embodiment of the invention.

Forming a part of this specification are drawings in which,

Fig. 2 is a plan view taken on line 2—2 of Fig. 1.

Fig. 3 is a fragmentary bottom plan view with parts broken away and parts shown in section.

Fig. 8 is a plan view of a plate showing a slight modification in the invention.

Fig. 9 is a diagrammatic view illustrating the wiring used in the invention.

Fig. 10 is a central longitudinal sectional view of a nozzle used in the invention.

Fig. 12 is a longitudinal central sectional view showing a further modification.

Fig. 13 is a fragmentary sectional view showing a modification.

Fig. 14 is a schematic view illustrating the modification shown in Fig. 13.

Figure 1:
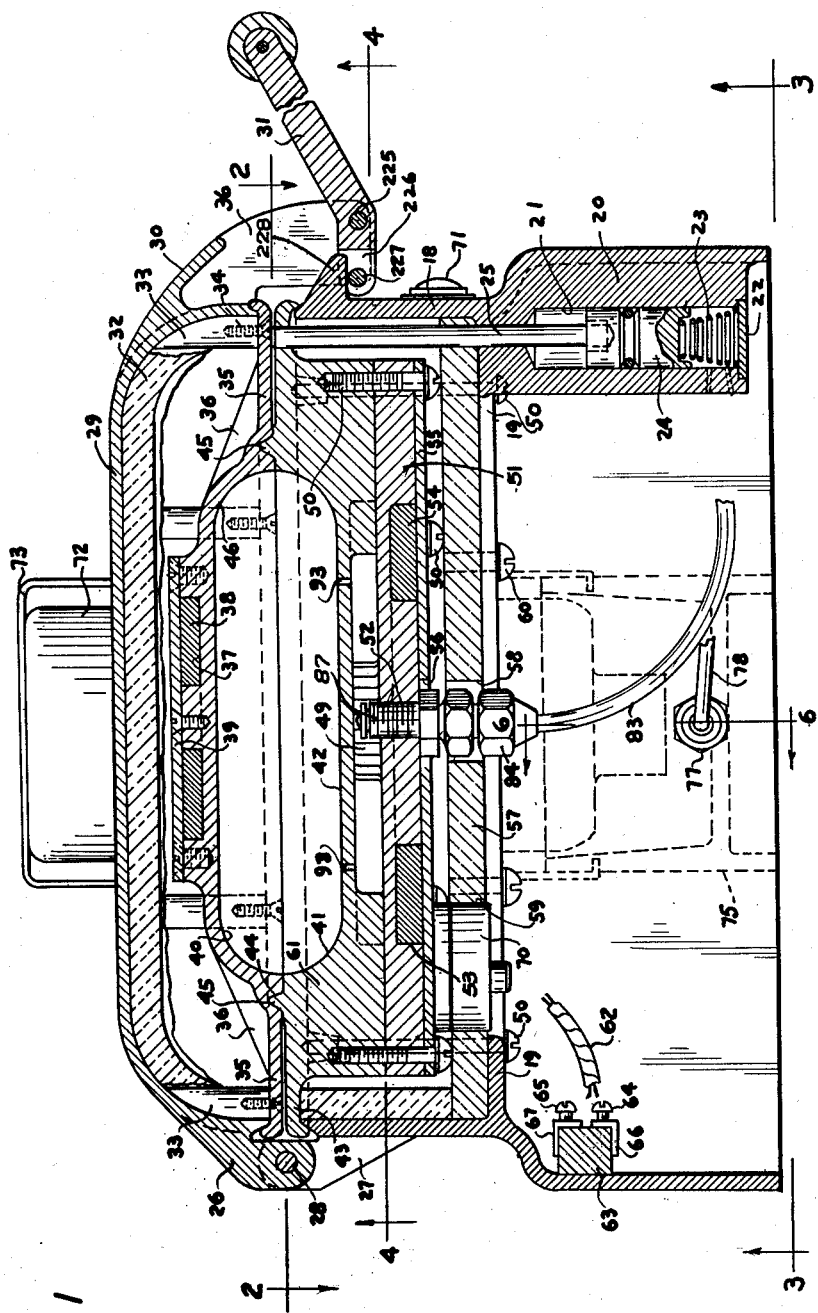
Fig. 1 is a longitudinal vertical sectional view, taken on line 1—1 of Fig. 2.
Figure 4:
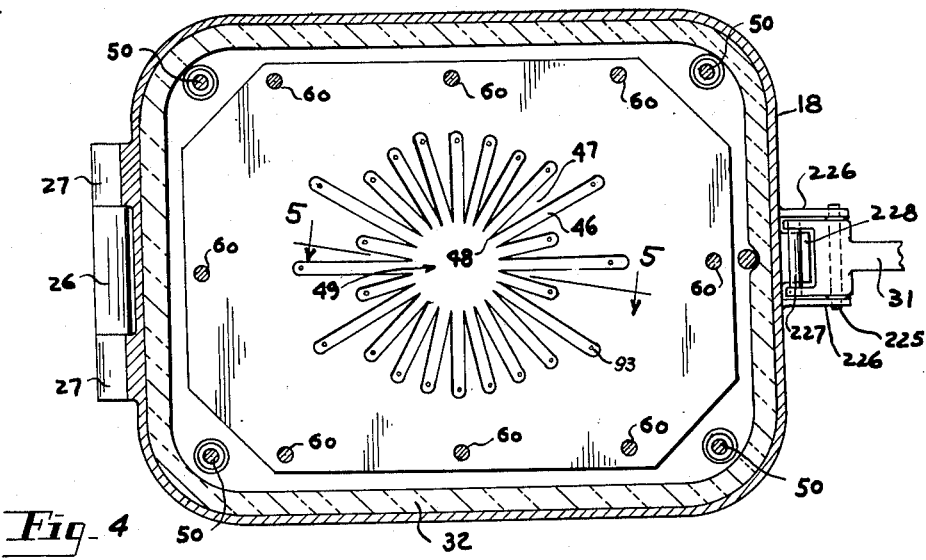
Fig. 4 is a fragmentary sectional view taken on line 4—4 of Fig. 1.
Figures 5, 7:
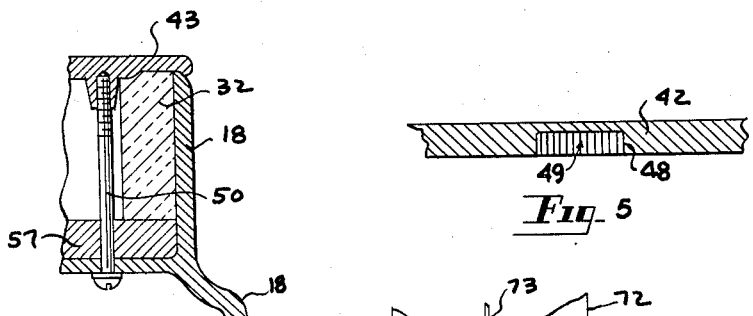
Fig. 5 is a fragmentary sectional view taken on line 5—5 of Fig. 4.
Fig. 7 is a fragmentary sectional view taken on line 7—7 of Fig. 2.
Figure 6:
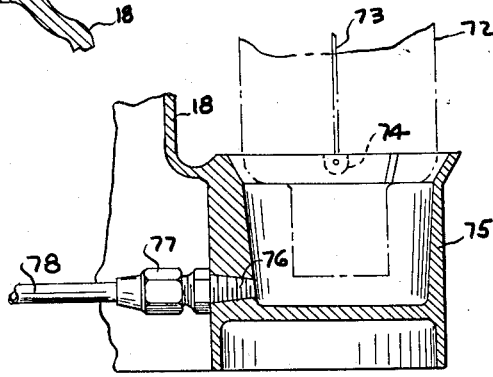
Fig. 6 is a fragmentary sectional view taken on line 6—6 of Fig. 1.

As shown in the drawings the invention as illustrated comprises a base 18 having between the top and the bottom thereof the inwardly projecting flange 19. Formed on this base at one side is the enlarged boss 20 in which is formed a cylinder 21 closed at its lower end by the plug 22 against which bears one end of a spring 23, the opposite end bearing against a piston or plunger 24 which is slidably mounted in the cylinder and which is provided with a piston rod 25. Projecting outwardly from this base, at one side, is a bracket forming projection 27 on which is pivotly mounted, by means of the pin 28, the bracket forming portion 26 which extends outwardly from one side of the cover 29. Extending outwardly from one side of this cover 29 is the bracket 30 on which a handle 31 is pivotly mounted by means of the pin 225. Extended thru the separated projecting ends 226 of this handle 31 is a pin 227 which is adapted to engage with the nose 228 formed on the base. When the cover is swung downwardly in closing position as shown in Fig. 1 the downward pressure on the member 31 will draw the cover down tightly so as to force the rod 25 downwardly against the compression of the spring 23.

Covering the inner face of this cover 29 is the layer 32 of suitable heat insulating material. Formed on this layer 32 are the enlargements or bosses 33 into which are adapted to thread the screws 34 which project thru the plate 35 and serve in addition to retaining the layer 32 of insulating material in position to retain the plate 35 in position and fixed relation to the upper portion of the cover.

As is plainly seen in Fig. 1 this plate 35 bulges outwardly at its central portion to provide the cavity 40, this outwardly bulged portion being connected to the planar portion of the plate 35 by means of the reinforcing rib 36. Formed in the outer face of this outwardly bulged portion is a recess 37 in which is positioned a circular electrically heating element 38 held in position by the cover 39. The cavity 40 serves to cooperate with the cavity 41 to provide a chamber in which the food product to be treated is positioned.

A planar marginal portion 43 of the plate 42 extends outwardly and rests upon the upper edge of the base 18. Formed in the opposing faces of these plates 42 and 45 is the groove 44 and the bead 45 which inter-engages to provide a tight, leak-proof connection when the cover is in closed position.

Formed in the under surface of the plate 42 is a plurality of grooves or troughs 46 separated by the ribs 47 which taper to a point 48 and open into a well 49, these troughs 46 radiating outwardly from the well 49.

Secured by the screws 50 to the plate 42 is a plate 51 having the central opening 52 opening into the well 49 and provided with a curved recess or groove 53 for reception of an electric heating element 54 which is held in position by the cover 55 through which the screws 50 also project. Positioned below the plate 51 and resting upon the flange 19 is a plate 57 of heat insulating material having the openings 58 and 59 formed therein. Extending thru the flange 19 and threaded into the marginal portion of the plate 42 are screws 50 which serve to bind the planar portion 43 of the plate 42 in tight engagement with the upper edge of base 18.

Extending from within the base 18 into the interior of the cover 29 is an electric cable 62 which carries the wires to the heating element 38.

As shown in Fig. 1 there is a supporting block of insulating material 63 which carries the metallic bars 66 and 67. Carried by the bar 66 are the electric terminals 64 and like terminals 65 are carried by the bar 67. As shown in the diagrammatic view illustrated in Fig. 9 the bar 67 is connected to the wire 68 which serves as one of the feed wires and which may be connected to a plug-in socket. The other wire 69 is connected through the thermostat 70 to the bar 66. The heating elements 38 and 54 are electrically connected as shown in the diagrammatic view. A light bulb 71 is also electrically connected to indicate to the operator when the current is turned off.

With the device we provide a water container 72 which is held in position by the bail 73 pivotally connected to the lug 74 mounted on the reservoir 75 which forms a part of the base. Communicating with the interior of this reservoir, below the normal water level therein, is a pipe 76 which communicates with fitting 77 leading from which is a pipe 78, as shown in Fig. 3, which communicates with the fittings 79 and in which is positioned a check valve 80; this fitting 79 communicating with the interior of the cylinder 21 below the piston or plunger 24. This is an inlet delivery pipe for delivering liquid into the interior of the cylinder 21. An outlet delivery pipe 83 communicates thru the fitting and check-valve 82 with the interior of the cylinder 21. This outlet delivery pipe is secured, as shown in Fig. 1, by the fitting 84 to a nozzle 87, there being a check-valve 85 normally held in closed position by means of the spring 86 located at the end of the pipe 83. This nozzle 87 is shown in detail in Fig. 10 and has a central bore 88 communicating with the diagonally inclined passages 89 which communicate with the circular groove 89a. The nozzle body 87 has a reduced portion 91 and positioned around this reduced portion 91 is a spacing collar 92 to space the disk 90 from the end of the nozzle. The reduced portion 91 projects thru the disk 90 and is upset so that the disk 90 is fixedly mounted on this reduced portion 91. Between the end of the body 87 and the opposed face of the disk 90 is a space 92a which serves as a distributing space for liquids or other fluids forced thru the passages 88.

Formed thru the plate 42 so as to communicate with the channels or troughs 46 are very fine openings 93. In the form shown we have illustrated a pair of the cavities 40 and 41, the pair being separated by the partition 94.

In the use of the mechanism a thermostat would be set to the required position and the current turned on. It will be noticed that the heating element 39 is not insulated from the member 35 and also that the heating element 54 is not insulated from the plate 51 so that the entire plate 35 and the entire plate 51 as well as the plate 42, which is in contact therewith, in reality become a heating element. When the desired temperature has been reached the thermostat will, of course, turn off the current and when the mechanism lowers below the desired temperature the current will again be turned on. It is desirable that the heat in the troughs 46 be maintained at approximately 240 degrees Fahrenheit. When it is desired to use the mechanism the cover 29 is swung upwardly and the bun is placed in one of the compartments 41. As this cover is swung upwardly the piston 27 will move upwardly in response to the pressure of the spring 23, thus drawing into the cylinder 21, from the inlet delivery pipe 78, a predetermined amount of water. As the cover is lowered to closed position as shown in Fig. 1 the piston rod 25 will force the plunger or piston 24 downwardly to expel a predetermined quantity of water outwardly thru the outlet pipe 83. This water will be delivered thru the passage 88 formed in the nozzle and outwardly thru the lateral passages 89 into the groove 89a from which it will be forced outwardly thru the lateral passages 89 into the groove 89a from which it will be forced outwardly beneath the disk 92 a thin sheet-like formation so as to strike against the sharp ends of the ribs 47 which are located between each of the channels 46. In this manner the liquid is divided into a plurality of very fine streams which pass into the channels or troughs 46 and these fine streams are instantly turned into steam and, on account of the high temperature, the steam becomes super-heated and consequently a dry super-heated steam is forced under pressure thru the openings 93. Experience has shown that the steam ejected thru these openings 93 will pass inwardly into the buns and with the ordinary elongated bun of customary size this penetration will be about to the center of the bun. At the same time the steam will surround the bun and fill both of the cavities 41 and 40. Experience has shown that when a bun is placed in the cavity 41 and the cover lowered, it may be immediately raised as the steaming of the bun is instantaneous or done in a "flash." The device may be used indefinitely for repeated operations so that the operator may continue to place a bun in the bun receiving chamber, lower the cover and immediately raise the cover and remove the bun and replace it with another. Experience has also shown that a very palatable produce is obtained and the texture of the bun considerably increased because of being subjected to a steaming operation in this manner. The water container 72 is preferably transparent, so that all observers may readily ascertain that the water used for steaming is clean while at the same time the operator may observe when it is necessary to remove and replace the container 72 because of the consumption of water.

In Fig. 8 we have illustrated a slight modification. In this view we have shown a plate 43a which would be substituted for the plate 42 which has a marginal flange 43a and is provided with a cavity 41a. The under surface of this plate 42a would be constructed as the under surface of the plate 42 having the channels 46a with the opening 93a and the well 49a. The cavity 41a thus formed would be sufficient to receive a pair of circular buns 94. When this plate 43a is used the cover 29 would, of course, be modified so far as the cavity 40 is concerned so as to cooperate with the cavity 41a to provide a chamber for reception of the circular buns 94.

Figure 11:
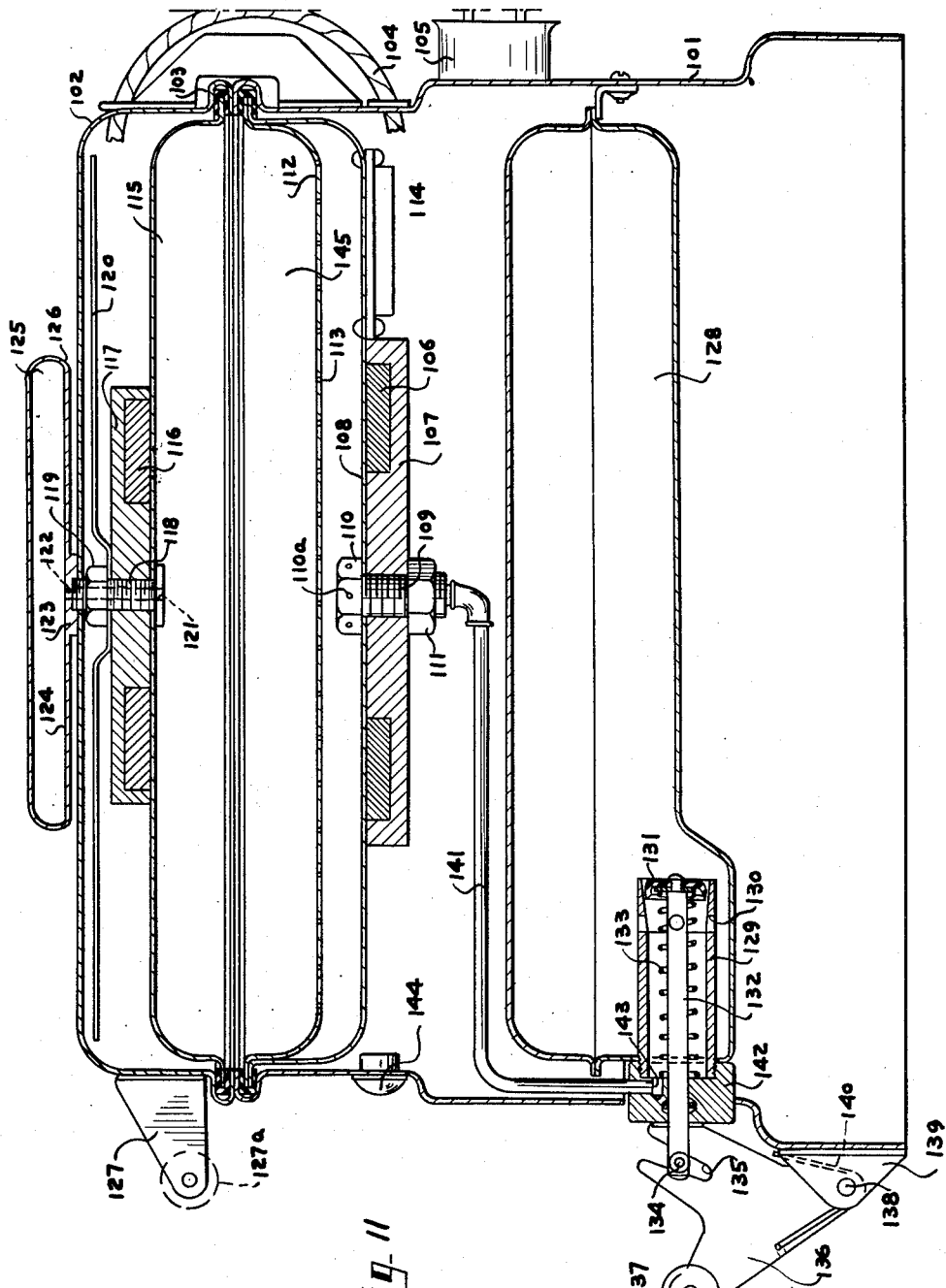
Fig. 11 is a longitudinal vertical sectional view showing a modification.

In Fig. 11 we have shown a modification which may be fabricated from stampings and which comprises a base 101. Slidably mounted on this base 101 by means of the hinge 103 is a cover 102. A cable 104 proceeds from the interior of the base 101 to the interior of the cover 102. An electric socket plug 105 is mounted on the base 101 to afford connections to the electric circuit. The heating element 106 is embedded in a groove in the block 107 of insulating material which is mounted on the plate 108 by means of the pipe 109 and the nuts 110 and 111. This nut 110 is of the cap type and has the lateral passages 110a from which fluid delivered thru the pipe 109 may pass into the space between plates 112 and 108. When this fluid strikes the plate 108 it will be converted into steam and super-heated and pass thru the openings 113 in the plate 112 into the chamber 145.

In the cover 102 is the concave dish-like member 115 supported on which is an electric heating element 116 fitted into the groove formed in the insulating block 117. This block is held mounted on the member 115 by means of the tubular screw 118 on which is threaded a nut 119 which also secures the deflecting plate 120 in position. This screw 118 threads into the hub 123 formed on the plate 124 which forms the bottom of a container 125 having an outlet opening 126 formed therein. Extended thru the screw 118 is a passage 121 communicating with the passage 122 formed in the hub 123 so that steam passing from the compartment or chamber 145 will pass into the member 125. A bracket 127 serves to support a handle 127a on the cover 102.

Mounted within the base 101 is a reservoir 128 in which water is deposited. Extending into this reservoir is a cylinder 129 having the openings 130 communicating with the interior of the reservoir 128. Slidably mounted in the cylinder 129 is a piston 131 connected to which is a piston rod 132. A coil spring 133 embraces the piston rod 132 and normally serves to retain the piston 131 forced to the right of Fig. 11.

A pin 134 is extended transversely thru the rod 132 and engages in a notch 135 formed in the plate 136 on which is mounted a handle 137 and which is pivoted at 138 on the bracket 139. A spring 140 serves to normally prevent downward rocking of the plate 136. Pipe 141 communicates with the interior of the pipe 109 and also opens into the passage 143 formed in the head 142. This passage 143 is in communication with the interior of the cylinder 129.

It is obvious that upon downward rocking of plate 136, the cylinder 131 will, when it is drawn to the left, trap the liquid contained within the cylinder 129 after it passes the opening 132 and thus force a predetermined amount of liquid to be projected outwardly thru the openings 110a. When the plate 108 is at the proper temperature this liquid will immediately be transformed into super-heated steam and pass thru the openings 113 to refreshen the bun or other article placed in chamber 145.

In Fig. 12 we have shown a further modification in which we have illustrated the base 150 supporting the block 151 having a chamber 152 formed therein communicating thru the openings 153 with the receiving cavity 154. Formed in the bottom of the block 151 is a circular groove 155 in which is positioned an electric heating element 156 controlled by the thermostat 157 and held in position by means of plate 158.

A cover 159 contains a cup shaped member 160 having the cavity 167 formed therein and provided on its base, at the outer side thereof, is a circular recess 161 in which is positioned an electric heating element 162 held in place by the plate 163. Projecting thru the plate 160 and thru the plate 163 is the tubular member 164 which also projects thru the cover 151 and is held in position by means of the nut 165. A flange 166 serves to support the member 160. Mounted in the block 151 is the fitting 168 having the passage 169 leading therefrom to a distributing head 170. Communicating with this passage 168 is a pipe 180 connected by the fitting 181 in communication with the cylinder 182 which is enclosed by the cylinder 183, this cylinder and sleeve being supported by the supports 184 and 185. Slidably mounted in the cylinder 182 is a piston 186 projecting from which is the piston rod 187 which is pivotably connected by means of the pin 189 extended thru the slot 190 to the rockable arm 188. This arm 188 is fixedly mounted on the shaft 191 which is journaled in the block 192 so that by rocking of the shaft 191 reciprocation of the piston 186 may be effected. Formed in the center of the cylinder 182 are the openings 182a communicating with the interior of the sleeve 183.

A reservoir 193 is mounted on the base of 150 by means of the bracket 194. The interior of this reservoir is in communication with the pipe 197 thru the fittings 195 and 196. A water container 198 is positioned in an inverted position on the reservoir 193 so that water may flow out of the container 198 into the reservoir 193 and thru the pipe 197 into the interior of the sleeve 183. Upon reciprocation of the piston 186 to the left of Fig. 12 so as to uncover the openings 182a it is believed obvious that a quantity of water will flow into the cylinder 182 in front of the piston. Upon movement of the piston in the opposite direction this amount of trapped water will be forced outwardly thru the pipe 199 to be deposited upon the bottom of the chamber 152 where it will immediately be converted into steam so as to pass thru the openings 153. The excess steam will pass outwardly from the cavities 154—167 thru the tube 164. These cavities 154 and 167 together form a chamber into which the article to be refreshened by the steam is to be deposited. The base and reservoir are supported by supporting legs 199. In these two modified forms shown in Fig. 11 and Fig. 12 the predetermined amount of water is thus forced into the steam generating chamber and converted into steam and permitted to pass thru narrow openings into the chamber into which the article to be refreshened is positioned and a flash steaming is thus accomplished in these modified forms as well as in the preferred form.

In Fig. 13 and Fig. 14 we have shown a slight modification in which the water container is attached directly to the city supply of water or other source of water under pressure. Positioned within the base 18b and below the flange 19a, a block 260 having a cylinder forming passage 261 formed therein. Slidable in this passage 261 are the valve spools 262 and 263 connected together by the member 264. Communicating with the passage 261 is the enlarged recess 266 in which slidably engages the plunger 267 having at its lower end a collar 268 which snugly fits the recess 266 and serves as a guide. A stand 269 forms the continuation of the plunger 267 and is provided with a tapered end 270 seating in the tapered recess or cavity 271 formed in the pin 272 which is carried by the plate 35a of the cover and which is adapted to project thru the opening 273 formed in the flange 43a.

Formed in the block 260 is a reservoir 274 which serves as a cylinder for the piston 275 which is slidably mounted therein and which is normally urged upwardly by the spring 276. This chamber or reservoir 274 communicates thru the passage 277 with the interior of the passage 261. A conduit 278 is in communication with the water supply system under pressure and communicates with the passage 261. A conduit 279 communicates with the passage 261 and corresponds to the pipe or conduit 83 shown in Fig. 1. As shown in Fig. 13 the valve spools 262 and 263 have been moved downwardly against the compression of the spring 265 and the communication of the conduit 278 with the passage 261 is closed while the communication of the conduit 279 with the passage 261 is opened. Upon raising the cover so that the pin 272 is raised upwardly, the valve spools will move upwardly in response to the pressure of the spring 265 so that the communication of the conduit 279 with the passage 261 will be closed and communication of the conduit 278 with the passage 261 will be open. When this conduit 278 is opened by the valve spool 262, a water under pressure will flow from the conduit 278 into the passage 261 and thence thru the passage 277 into the chamber 274 forcing the piston 275 downwardly against the compression of the spring 276 so that the space above the piston 275 will be filled with water under pressure. When the cover is again lowered, the valve spools will be moved to the position shown in Fig. 13 and the water within the chamber 274 will be forced outwardly by virtue of the piston 275 moving upwardly in response to the pressure of the spring 276 thus delivering a predetermined amount of water to the outlet nozzle.

This structure shown in Fig. 13 and Fig. 14 is one which is desirable in many instances over the structure in which the water container is used. Particularly is this so from the standpoint of convenience and sanitation.

What we claim is:

1. In a flash steamer of the class described, a liquid receiving compartment; a heating element for heating said compartment; a conduit for delivering liquid into said compartment; and a metering device interposed in said conduit for, upon actuation, metering the amount of liquid delivered into said compartment; an article receiving compartment for the reception of articles placed therein and having openings formed therein communicating with said liquid receiving compartment for reception of steam from said liquid receiving compartment; a cover for said article receiving compartment; and a plunger engageable with said cover upon closing the same for actuating said metering device.

2. In a flash steamer of the class described, an article receiving compartment; a cover for said compartment, a heating element for heating said compartment; a liquid receiving compartment; a heating element for heating said liquid receiving compartment and converting into steam water delivered thereinto; a conduit for conducting water into said water receiving compartment, there being openings communicating said water receiving compartment with said first named compartment; and a metering mechanism interposed in said conduit for, upon actuation, measuring the amount of water delivered into said water receiving compartment thru said conduit; said cover being swingable to open and closed positions and a plunger engageable with said cover upon movement of the same to closed positions for actuating said metering device.

3. In a flash steamer of the class described, a plate having a cavity formed therein for the reception of articles deposited therein; a cover swingably mounted on said plate and having a cavity formed therein in opposed relation to the cavity in said plate to provide, with said cavity, a compartment; a heating element for heating said compartment; a liquid receiving compartment adapted for the reception of liquids; a heating element for heating said liquid receiving compartment and converting the liquid into steam, said liquid receiving compartment being in communication thru openings with said first named cavity;

a conduit for delivering liquid into said liquid receiving compartment; a nozzle in said liquid receiving compartment for converting the liquid into a fine spray; a plurality of spaced-apart blades in said liquid receiving compartment for separating said spray into separate divisions; and a slidable plunger interposed in said circuit and adapted upon sliding movement for controlling the delivery of liquid thru said conduit and determining the amount of liquid delivered thru said conduit.

4. In a flash steamer of the class described, a plate having a cavity formed therein for the reception of articles deposited therein; a cover swingably mounted on said plate and having a cavity formed therein in opposed relation to the cavity in said plate to provide with said cavity a compartment; a heating element for heating said compartment; a liquid receiving compartment adapted for the reception of liquids; a heating element for heating said liquid receiving compartment and converting the liquid into steam, said liquid receiving compartment being in communication thru openings with said first named cavity; a conduit for delivering liquid into said liquid receiving compartment; a nozzle in said liquid receiving compartment for converting the liquid into a fine spray; a plurality of spaced-apart blades in said liquid receiving compartment for separating said spray into separate divisions; and a slidable plunger interposed in said conduit and adapted upon sliding movement for controlling the delivery of liquid thru said conduit and determining the amount of liquid delivered thru said conduit; and a push rod operable for moving said plunger in one direction upon moving of the cover into closed position.

5. In a flash steamer of the class described, a plate having a cavity formed therein for the reception of articles deposited therein; a cover swingably mounted on said plate and having a cavity formed therein in opposed relation to the cavity in said plate to provide with said cavity a compartment; a heating element for heating said compartment; a liquid receiving compartment adapted for the reception of liquids; a heating element for heating said liquid receiving compartment and converting the liquid into steam, said liquid receiving compartment being in communication thru openings with said first named cavity; a conduit for delivering liquid into said liquid receiving compartment; a nozzle in said liquid receiving compartment for converting the liquid into a fine spray; a plurality of spaced-apart blades in said liquid receiving compartment for separating said spray into separate divisions; and a slidable plunger interposed in said conduit and adapted upon sliding movement for controlling the delivery of liquid thru said conduit and determining the amount of liquid delivered thru said conduit; and a push rod operable for moving said plunger in one direction upon moving of the cover into closed position; and a handle on said cover for securing said cover in closed position.

6. In a flash steamer for refreshening food products, a plate having a cavity formed therein; a cover swingably mounted on said plate and having a cavity formed therein in opposed relation to the cavity in said plate to provide with said cavity a compartment for reception of articles placed therein; a liquid receiving compartment adapted for the reception of liquids and placed in juxtaposition to said first-named compartment, one of the sides of said first-named compartment having openings formed therethrough communicating with said liquid receiving compartment, said cover being movable to open and closed position; a conduit for delivering liquid into said liquid receiving compartment; a metering mechanism interposed in said circuit and operable upon swinging of said cover from open to closed position for metering and delivering into said liquid receiving compartment a predetermined amount of liquid; and a heating element for heating said liquid receiving compartment and maintaining the same at a temperature sufficiently high for converting liquid delivered into said liquid receiving compartment into steam.

7. In a flash steamer for refreshening food products, an article receiving compartment for reception of articles placed therein; a cover for closing said article receiving compartment, said cover being swingable to open and closed position; a liquid receiving compartment in juxtaposition to said first-named compartment for reception of liquid, there being a plurality of openings establishing communication between said compartments; a heating element for heating said liquid receiving compartment for converting into steam liquid delivered thereinto; a conduit for delivering liquid into said liquid receiving compartment; and a metering mechanism interposed in said circuit for metering and delivering a predetermined amount of liquid into said liquid receiving compartment upon the movement of said cover from open to closed position.

8. In a flash steamer for refreshening food products, an article receiving compartment for reception of articles placed therein; a cover for closing said article receiving compartment, said cover being swingable to open and closed position; a liquid receiving compartment in juxtaposition to said first-named compartment for reception of liquid, there being a plurality of openings establishing communication between said compartments; a heating element for heating said liquid receiving compartment for converting into steam liquid delivered thereinto; a conduit for delivering liquid into said liquid receiving compartment; and a metering mechanism interposed in said circuit for metering and delivering a predetermined amount of liquid into said liquid receiving compartment upon the movement of said cover from open to closed position; and a heating element for heating said first-named compartment.

References Cited in the file of this patent

UNITED STATES PATENTS

| Number | Name | Date |
| --- | --- | --- |
| 666,216 | Zeininger | Jan. 15, 1901 |
| 771,795 | Gilmor | Oct. 4, 1904 |
| 1,081,463 | Pentz | Dec. 16, 1913 |
| 1,226,500 | Fuehler | May 15, 1917 |
| 1,282,252 | Lueders | Oct. 22, 1918 |
| 2,039,313 | Haas | May 5, 1936 |
| 2,082,460 | Omsted | June 1, 1937 |
| 2,088,462 | Buffum | July 27, 1937 |
| 2,118,177 | Davis | Nov. 28, 1939 |
| 2,161,613 | Coffing | June 6, 1939 |
| 2,291,423 | Tiscornia | July 28, 1942 |
| 2,426,939 | Libman et al. | Sept. 2, 1947 |
| 2,469,778 | Morici | May 10, 1949 |
| 2,502,445 | Fash | Apr. 4, 1950 |
| 2,505,656 | Wagner | Apr. 25, 1950 |